Jan. 18, 1938.  O. LARSON  2,105,485

TRANSMISSION MECHANISM

Filed April 22, 1935   3 Sheets-Sheet 1

INVENTOR:
Otto Larson.
BY Frank W. Halliday
ATTORNEY.

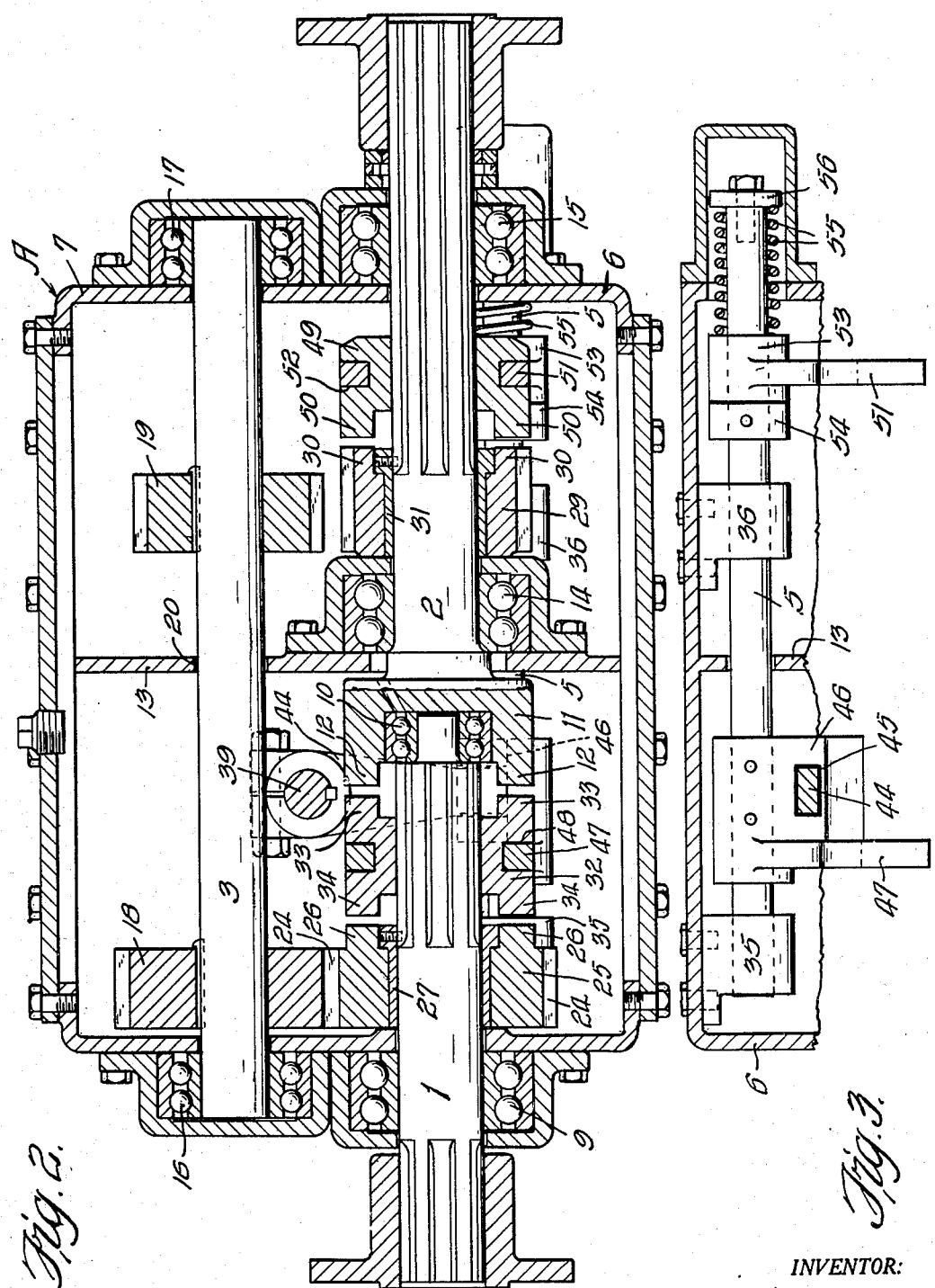

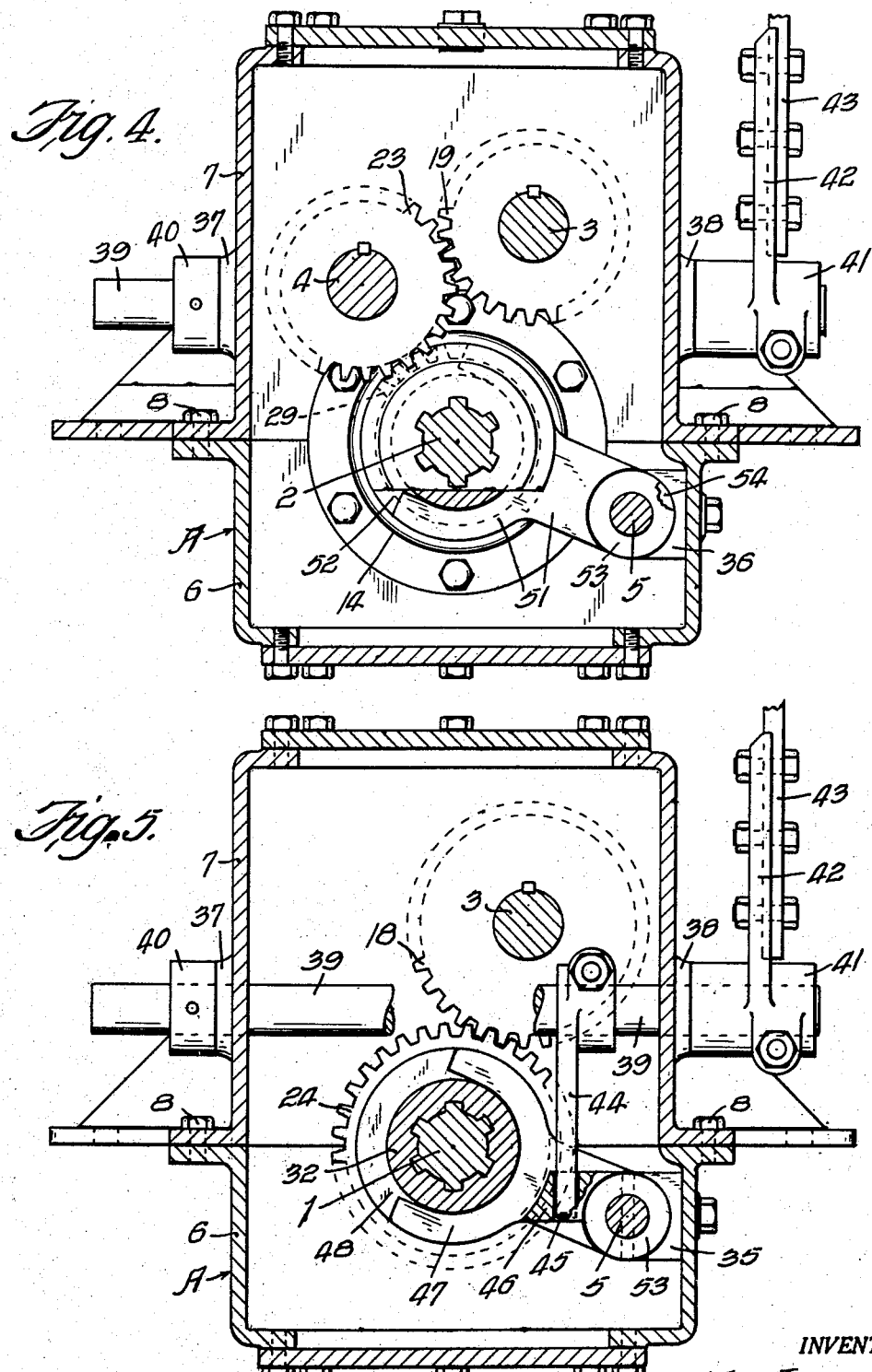

Patented Jan. 18, 1938

2,105,485

UNITED STATES PATENT OFFICE 2,105,485

TRANSMISSION MECHANISM

Otto Larson, St. Louis, Mo.

Application April 22, 1935, Serial No. 17,665

3 Claims. (Cl. 74—377)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to watercraft transmission mechanism, such for instance, as employed in motor driven boats, although not necessarily limited thereto, and more particularly has reference to the reverse mechanism in the transmission.

In the operation of motor driven boats having the conventional, or planetary transmission gearing, both in forward drive and in reverse drive, the efficiency of the transmission is very low, and, it is an object of my invention to provide a mechanism to prevent the loss of power transmitted from the driving member to the driven member, whether the boat is being driven forwardly, or rearwardly.

Another object of the invention is to provide a motor boat transmission mechanism having a plurality of claw clutch devices for connecting a driving member and a designated, or reverse gear train to a driven member to transmit torque thereto without slippage therebetween so that the driven member will have the same power as the driving member.

Another object of the invention is to provide a transmission mechanism having clutch devices, and resilient means for moving one of the clutch devices into engaged position and with a predetermined pressure to drive the driven member in reverse relation to the driving member.

Another object of the invention is to provide lever actuated means for sliding a double clutch device from neutral position into direct driving engagement with a driven shaft, and from said engagement through neutral, or direct from neutral to gear connections into indirect driving engagement with another clutch device for imparting rotation to the driven shaft in reverse relation to the driving shaft, said latter clutch device being forced resiliently into driving engagement and moved out of driving engagement by means on a sliding rod.

A further object of the invention is to provide a transmission having clutch devices, operating means therefor, which are simple in construction, accessible, and which may be readily assembled and taken down.

Other objects of the invention will appear from the following description when read in connection with the drawings, and in which:

Fig. 2 is a view, partially in side elevation and partially in irregular vertical sectional elevation through the transmission mechanism.

Fig. 3 is a detail in plan view of the slidably mounted shifting rod and its associated parts.

Fig. 4 is a transverse vertical sectional view taken through the driven shaft of the transmission mechanism.

Fig. 5 is a transverse sectional view taken through the driving shaft of the transmission mechanism.

Figure 1:
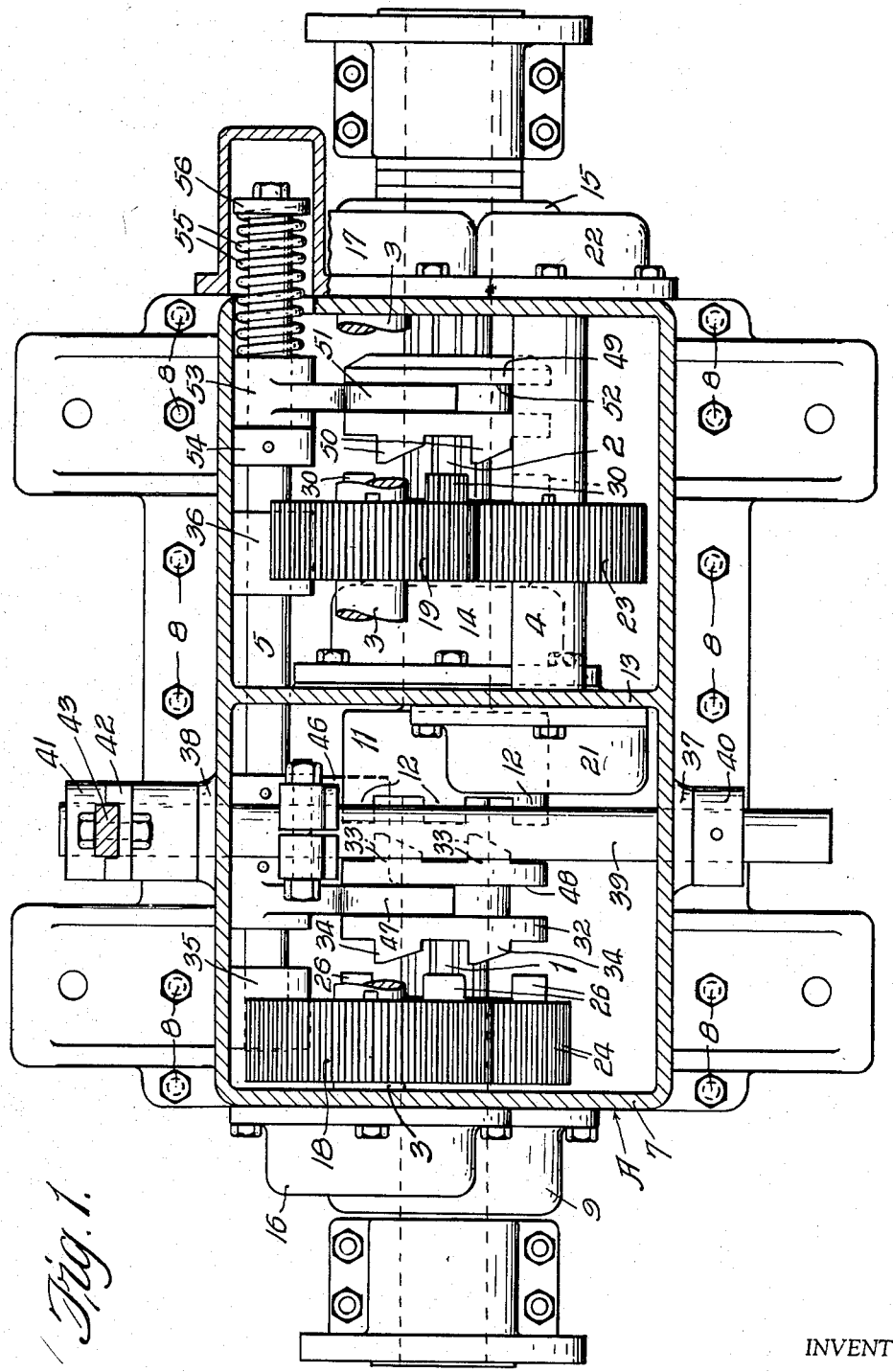
Fig. 1 is a view, partially in plan view and partially in horizontal section through a transmission mechanism constructed in accordance with the invention.

Referring to the drawings, in Fig. 1, is shown a transmission mechanism comprising a splined driving member, or shaft 1, a splined driven member, or shaft 2, a countershaft 3, a second countershaft 4 and a shifting shaft 5 slidably mounted within a transmission case designated generally, as A, the case A consisting of a flanged bottom section 6 and a flanged top section 7 secured together by means of suitable fastening devices 8. The front wall of the case carries a suitable bearing designated generally, as 9, in which is mounted a forward end portion of the driving shaft 1, which latter shaft is driven by a suitable boat engine through conventional clutch mechanism, not shown. The inner end of the driving shaft 1 is mounted in a suitable bearing designated generally, as 10, carried in a recess in a clutch member 11 having suitable surface claws 12. The clutch member 11 is secured to the inner end of the driven shaft 2, as will be apparent from Fig. 2. A separable partition 13 within the case A, is carried by the case sections 6 and 7, and, the partition and the rear wall of the case carry suitable bearings designated generally, as 14 and 15, respectively, and within which bearings the driven shaft 2 is mounted.

The front and rear walls of the case A carry suitable bearings designated generally, as 16 and 17, respectively, in which is mounted the countershaft 3 carrying gears 18 and 19 which are suitably secured thereto. The shaft 3 passes through an opening 20 in that part of the partition 13 carried by the top case section 7.

The partition 13 and the rear wall of the case A carry suitable bearings designated generally, as 21 and 22, respectively, and in which bearings is mounted the second countershaft 4 carrying a gear 23, which gear is suitably secured thereto and serves as an idle gear in mesh with gear 19.

Gear 18 on countershaft 3 meshes with gear teeth 24 on a clutch member 25, which member is provided with suitable surface claws 26. The clutch member 25 is mounted on a suitable flanged bushing 27 which is suitably secured to the driving shaft 1 to prevent displacement thereof longitudinally on the shaft.

Gear 23 on countershaft 4 meshes with gear teeth 28 on a clutch member 29, which member is provided with surface claws 30. The clutch member 29 is mounted on a suitable flanged bushing 31 which is suitably secured to the driven shaft 2 to prevent displacement thereof longitudinally on the shaft.

A suitable double faced clutch member 32 is slidably mounted on a splined portion of the driving shaft 1 between the clutch members 11 and 25. The sliding clutch member 32 is provided on its rear face with suitable claws 33, and on its front face with suitable claws 34. Claws 33 are adapted for engagement with the claws 12 on the clutch member 11, and the claws 34 are adapted for engagement with the claws 26 on the clutch member 25, dependent, of course, upon the position of the sliding clutch member 32 relative to the clutch members 11 and 25, when not in neutral position therebetween.

One of the side walls of the lower case section 6 carries a pair of suitable bearings designated 35 and 36, in which the shifting shaft 5 is mounted for sliding movement longitudinally of the case A.

The side walls of the upper case section 7 carries a pair of suitable bearings designated 37 and 38 in which is mounted an operating shaft 39 disposed transversely of the case A above the driving shaft 1. The shaft 39 is held against longitudinal movement in one direction by the retaining collar 40 disposed on the shaft outside the case A, and in the opposite direction by means of a head 41 on the lower end of a suitable shifting supporting lever arm 42 which carries an outside shifting lever 43. The shifting lever 43 is operated from the pilot house on a boat convenient to the steering device, through suitable connections, not shown.

A suitable shifting arm 44 is suitably secured to the shaft 39 inside the case A, and so positioned on the shaft as to be disposed above a suitable opening 45 in an enlargement 46 projecting from a suitable shifting fork 47 which is suitably secured to the shifting shaft 5. The shifting fork 47 engages in a peripheral groove 48 on the sliding clutch member 32. The lower free end of the inside shifting arm 42 having engagement at its lower end in the opening 45 of the fork enlargement 46 will, when oscillating movement is imparted to the shaft 39 in one extreme direction, move the sliding clutch member 32 rearwardly to cause the clutch claws 33 thereon to engage the clutch claws 12 on the clutch member 11 to directly connect the driving shaft 1 with the driven shaft 2 so as to rotate the driven shaft at the same speed and in the same direction as driving shaft 1. Oscillating movement of the shaft 39 in the opposite extreme direction will move the sliding clutch 32 forwardly to cause the clutch claws 34 to engage the clutch claws 26 on clutch member 25 to connect the driving shaft 1 with the clutch member 25 for rotating the clutch members 25 and 29 through the reverse gear train hereinbefore described.

A suitable clutch member 49 is mounted for sliding movement on a splined portion of the driven shaft 2, and the clutch member is provided on one of its side faces with suitable claws 50. The sliding clutch member 49 is connected with the shifting shaft 5 through the medium of a suitable shifting fork 51 which rides in a peripheral groove 52 on the sliding clutch member 49. The fork 51 is provided with a head 53 which is slidably mounted on the shifting shaft 5. The shifting shaft 5 carries a stop collar 54 which is suitably secured thereto and serves to simultaneously move the sliding clutch member 49 into neutral position when the sliding clutch member 32 is moved from extreme forward position to neutral position, and, further to move the sliding clutch member 49 in its neutral position when sliding clutch member 32 is moved from neutral position to extreme rearward position for connecting or coupling the driving shaft 1 in direct drive or interlocking engagement with the driven shaft 2.

A coiled spring 55 encircles the rear end of the shifting shaft 5 and is disposed between the head 53 on the shifting fork 51 and a cap 56, which is suitably secured on one end of the shifting shaft 5, as shown in Fig. 3. The spring 55 serves to force the shifting fork 51 and the sliding clutch member 49 forwardly, but only to a neutral position relative to clutch member 29, due to stop collar 53 on shifting shaft 5 when the double faced sliding clutch member 32 on driving shaft 1 is moved into neutral position from engagement with clutch member 11 on driven shaft 2. The spring further serves to force the clutch claws 50 on sliding clutch member 49 first into surface contact with the clutch claws 30 on the clutch member 29, mounted on the driven shaft 2, when the clutch member 32 is moved into interlocked engagement with the clutch member 25 mounted on the driving shaft 1, and to finally resiliently force engagement of the clutch claws 50 with the clutch claws 30 to effect a positive reverse drive connection of driven shaft 2 relative to the driving shaft 1.

Interlocked engagement of the sliding clutch member 32, with the clutch member 25, is secured by moving the shifting lever 43 rearwardly to effect mechanism to slide the clutch member 32 in a forwardly direction on the driving shaft 1 so as to bring the clutch claws 34 thereon into engagement with the clutch claws 26 on clutch member 25. During said operation, the sliding clutch member 49 is resiliently moved in a forward direction on the driven shaft 2 by action of the coiled spring 55 encircling the shifting shaft 5 to bring the clutch claws 50 on clutch member 49 first into surface contact only with the clutch claws 30 on clutch member 29 mounted on driven shaft 2, and then into final interlocked engagement with the clutch claws 30 on clutch member 29 to positively effect rotation of the driven shaft 2 in a direction reverse to the rotation of the driving shaft 1.

Interlocking engagement of the clutch claws 33 on sliding clutch member 32 with the clutch claws 12 on the clutch member 11, is secured by moving the shifting lever 43 forwardly to effect mechanism to slide the clutch member 32 in a rearward direction on the driving shaft 1 to bring the claws 33 on the sliding clutch member 32 into interlocking engagement with the clutch claws 12 on clutch member 11, which effects a direct claw clutch connection between the driving shaft 1 and the driven shaft 2 to rotate the driven shaft 2 with and at the same speed and direction as the driving shaft 1.

The operation of the transmission mechanism will be readily understood from the foregoing description, and may be more fully understood from an example. Assuming that the transmission mechanism is in neutral position, as shown in Figs. 1 and 2, and it is desired to shift into direct forward drive. The lever 43 is actuated by any suitable means, not shown, or directly by hand, if convenient to do so. In this instance, the lever 43 is moved forwardly turning the shaft 39 and causing the shifting arm 44 thereon to move rearwardly at its lower end. The lower end of the arm 44 being disposed in the opening 45 in the fork enlargement 46 shifts the fork 47 and shifting shaft 5 rearwardly, thereby moving the sliding clutch member 32 rearwardly upon the driving shaft 1 causing the clutch claws 33 to engage the clutch claws 12 on the clutch member 11 which is secured to the inner end of the driven shaft 2. This forms the forward driving connection between the driving shaft 1 and the driven shaft 2 to cause the driven shaft 2 to rotate in the same direction and at the same speed as the driving shaft 1.

Now, we will assume it is desired to reverse the rotation of the driven shaft 2 relative to the rotation of the driving shaft 1. The lever 43 is moved rearwardly turning the shaft 39 to cause the shifting arm 44 to move forwardly at its lower end, thereby shifting the fork 47 forwardly to move the sliding clutch member 32 forwardly into neutral position, if in drive connection with shaft 2, and then forwardly therefrom causing the clutch claws 34 to engage or interlock with the clutch claws 26 on clutch member 25 which is rotatably mounted on the driving shaft 1. This causes the reverse gears to be set into motion. During this same movement of the lever 43, the shifting shaft 5 is moved forwardly by shifting arm 44, causing the stop collar 54 to move with the shaft 5, allowing the spring 55 to resiliently slide the shifting fork 51 along the shaft 5 to cause the clutch claws 50 to first facially engage the clutch claws 30 on gear toothed clutch member 29 which is rotatably mounted on shaft 2, and to then finally resiliently force the clutch claws 50 into final engagement with the clutch claws 30 to effect rotation of driven shaft in reverse relation to the rotation of the driving shaft 1. This effects a positive reverse drive of the driven shaft 2 so that the driven shaft will deliver the same amount of power as the driving shaft.

It will be understood the reverse gears in the transmission structure herein described do not rotate, but remain stationary when the mechanism is in forward drive, thus the reverse gears rotate only when the mechanism is in reverse or rearward drive. This feature eliminates wear on the gears and provides a device of great longevity and avoids the necessity of often repairs.

The many advantages of the herein described invention will readily suggest themselves to those skilled in the art to which it appertains.

While a specific embodiment of the invention has been herein described, which is deemed to be new and advantageous, it is not to be understood that the invention is limited or restricted to the exact details of construction shown and described, as it will be apparent that changes may be made therein without departing from the spirit of the invention within the scope of the appended claims.

What I claim is:

1. In a transmission the combination with a driving and a driven shaft and means to establish driving connections in direct and in reverse between said shafts, said means including slidable clutch members normally disposed in a neutral position, but shiftable to positions adapted to establish said driving connections in direct and in reverse; of a clutch control assembly coacting with said clutch members, said assembly including means which when moved in one direction act to simultaneously shift both of said clutch members from their neutral positions and to place one of said members in a position to establish its driving connection in direct, said means when moved in the opposite direction functioning to shift one of said clutch members in a corresponding direction, and additional means acting independently to move said remaining clutch member in the same direction, said additional means permitting the driving connection of said remaining clutch member to be retarded until that of the other of said clutch members has been completed.

2. In a transmission the combination with a driving and a driven shaft and means to establish driving connections in direct and in reverse between said shafts, said means including slidable clutch members normally disposed in a neutral position, but shiftable to positions adapted to establish said driving connections in direct and in reverse; of a clutch control assembly coacting with said clutch members, said assembly including means, which when moved in one direction, act to simultaneously shift both of said clutch members and to place one of said members in a position to establish its driving connection in direct, said means when moved in the opposite direction, functioning to shift one of said clutch members in a corresponding direction, and additional means acting independently to move the remaining clutch member in the same direction, said additional means permitting the driving connection of said remaining clutch to be retarded until that of the other of said clutch members has been completed, and comprising a clutch shifting rod and a resilient connection between said rod and the retardable clutch member.

3. In a transmission the combination with a driving and a driven shaft and means to establish driving connections in direct and in reverse between said shafts, said means including slidable clutch members normally disposed in a neutral position, but shiftable to positions adapted to establish the driving connections in direct and in reverse; of a clutch control assembly coacting with said clutch members, said assembly including means, which when moved in one direction from neutral, act to simultaneously shift both of said clutch members and to place one of said members in a position to establish its driving connection in direct, said means when moved in the opposite direction functioning to shift one of said clutch members in said opposite direction, and additional means acting independently to move the remaining clutch member in the same direction, said additional means permitting the driving connection of said remaining clutch member to be retarded until that of the other of said clutch members has been completed, said first mentioned means and said additional means comprising a longitudinal movable shifting rod, a fork keyed to the rod and engaging one of said clutch members, a second fork slidable on the shifting rod and engaging the remaining clutch member, a stop keyed to said shifting rod and limiting the sliding movement of the second fork along said rod, a spring encircling the shifting rod and having one end connected to the rod and the other end abutting said second fork to urge the latter against the stop.

OTTO LARSON.